United States Patent Office 2,828,311
Patented Mar. 25, 1958

2,828,311
CHINOLINE YELLOWS

Earl C. Gifford, Marietta, Ohio, assignor to American Cyanamid Company, New York, N. Y., a corporation of Maine No Drawing. Application August 10, 1956
Serial No. 603,238

4 Claims. (Cl. 260—289)

This invention relates to new dyestuffs of the quinophthalone series, and more specifically, it relates to new quinophthalone yellow dyestuffs derived from alpha naphthoquinaldine and chlorinated phthalic anhydrides.

The quinoline yellows derived from phthalic anhydride and various quinaldines are well known dyestuffs of commerce. They are produced by the condensation of phthalic anhydride with compounds containing the picoline nucleus, usually with a quinaldine. One of the most useful examples of this dyestuff has been the commercial dye Chinoline Yellow KT, obtained from beta-naphthoquinaldine and phthalic anhydride, followed by sulfonation. This dyestuff has been manufactured by a number of producers as a standard member of most dye lines. Recently however, there has developed a need to replace this dyestuff. It is derived from beta-naphthylamine by a Skraup synthesis, and the discovery in recent years that beta-naphthylamine is carcinogenic, with bad effects on the kidneys and livers of those exposed to it, has made the production of Chinoline Yellow KT a source of worry to the operators running the processes and to the manufacturers' managements. It has been necessary to check every person who ever worked with beta-naphthylamine on a monthly basis for signs of cancer, even years after they have ceased working with this chemical. Furthermore, because of the inherent dangers in dealing with this chemical, the larger producers of it are ceasing its manufacture.

While beta-naphthylamine is carcinogenic, the corresponding alpha-naphthylamine is innocuous and the condensation of the alpha-naphthoquinaldine derived therefrom with phthalic anhydride gives a yellow dyestuff of about the same shade as the corresponding beta isomer. However, the light fastness and tinctorial strength of this dyestuff are inferior, as compared to the beta compound, which is why manufacture of the beta isomeric Chinoline Yellow has been continued even after the discovery of the deleterious effects of the intermediate. The discovery of a way to prepare a dyestuff derived from alpha-naphthylamine, which would have good strength and light fastness would fill a long felt need in the art and eliminate the necessity for working with the dangerous beta-naphthylamine. It has been suggested in the past that quinaldines with a 3-hydroxyl group would give dyestuffs with improved light fastness, but these suggested dyes have never become important on the market because of the difficulty in obtaining the intermediates.

I have now discovered that quinophthalone dyestuffs of good strength and fastness to light can be obtained from alpha-naphthylamine if the resulting intermediate alpha naphthoquinaldine is condensed with a chlorinated phthalic anhydride. The Chinoline Yellow obtained from alpha-naphthoquinaldine and a chlorinated phthalic anhydride have tinctorial strength and light fastness as good as those of the dye obtained from the corresponding beta-naphthoquinaldine. It is thus an advantage of my invention that I am able to produce a Chinoline Yellow from readily available intermediates which present no problems of danger to the health of those working therewith, and which at the same time is an excellent dyestuff of commercial quality.

The chlorinated phthalic anhydrides which may be used in the condensation with alpha-naphthoquinaldine include 3-chlorophthalic anhydride, 3,6-dichlorophthalic anhydride, 4-chlorophthalic anhydride and tetrachlorophthalic anhydride. The resulting dyestuffs may be represented by the formula:

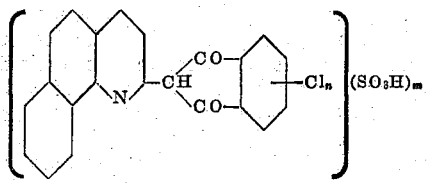

in which $n$ is a positive whole number less than 5 and in which $m$ is a positive number less than 3.

The dyestuffs of my invention are prepared by the usual proces, alpha-naphthylamine being condensed with crotonaldehyde in a Skraup synthesis to yield alpha naphthoquinaldine. This intermediate is then condensed with the chlorinated phthalic anhydride with or without a solvent. If a solvent is not used, the two ingredients are fused together at a high temperature. When a solvent is desired, a very convenient one is diethyl phthalate. The resultant product in either case is sulfonated with oleum and the product is isolated by salting. The number of sulfonic groups entering the molecule is usually two but can be less. Their purpose is to confer sufficient water solubility to use the dye in aqueous baths and no attempt is made to control the extent of sulfonation beyond achieving the requisite solubility.

The Chinoline Yellow dyes of my invention have the same utility which the Chinoline Yellow KT of the prior commercial use had. It may be used to color papers or in the formation of lakes in the same ways as the beta isomer has been utilized.

My invention may be illustrated by the following examples in which parts are by weight unless otherwise specified.

Example 1

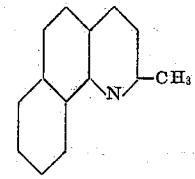

To a mixture of 660 parts 20° Bé. hydrochloric acid, 300 parts of alpha-naphthylamine, 35 parts of nitrobenzene, 15 parts of hydrated ferrous sulfate and 1 part of hydrated copper sulfate, heated to 100–103° C. there is added slowly a solution of 250 parts of crotonaldehyde and 79 parts nitrobenzene. The reaction mixture is stirred at reflux until the reaction is substantially complete. It is then neutralized to a pH of 7–9 with caustic soda and soda ash. Low boiling material such as quinaldine, aniline and nitrobenzene is then removed by steam stripping. The residual product is then washed free of salt by decantation and is then distilled at 3–6 mm. absolute pressure. The product boiling at 150–158° C. is collected.

Example 2

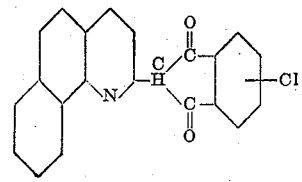

A mixture of 62 parts of the product of Example 1 and 59.5 parts of a mixture of 3 and 4 monochlorophthalic anhydride is heated at 208–212° C. until the reaction is substantially complete. The hot reaction mixture is then allowed to cool in a container from which it can be readily removed as a fused solid. It is ground to a powder.

Example 3

To 75 parts of 25% oleum, held at 45–50° C., there is added 30 parts of the product of Example 2, stirred at 55–60° C. until the product is solubilized to give solubility in water satisfactory for the uses desired. The mixture is then drowned in 1200 parts of water and basified to a pH of 8–9 with caustic soda and/or soda ash. Charcoal and a filter aid is added and mixture is heated and clarified. The filtrate is then salted with 25 parts of salt per 100 parts by volume of solution at a temperature of 90–95° C. It is then stirred and allowed to cool to 65° C. at which point the precipitated dyestuff is filtered and dried.

Example 4

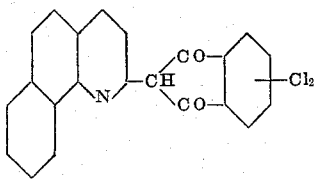

A mixture of 57.5 parts of dichlorophthalic anhydride, 50 parts of the product of Example 2 and 75 parts of diethyl phthalate is stirred at a temperature of 170–220° C. until the reaction is substantially complete. An additional 200 parts of diethyl phthalate is then added while keeping the mixture at a temperature of 180–210° C. The mixture is then cooled slowly to 60° C. and the precipitated product is isolated by filtration and washed with 300 parts of alcohol. The product is then freed of diethyl phethalate by reslurrying in 450 parts of alcohol and heated to 60° C. at which temperature it is again filtered. After washing the precipitate with a small amount of additional alcohol, the product is then dried.

Example 5

To 100 parts of 25% oleum held at 45–50° C. is added slowly 30 parts of the product of Example 4. The mixture is stirred at 60–70° C. until solubility satisfactory for the intended uses is obtained. The addition of an added 25 parts of 25% oleum toward the end of the reaction helps achieve the desired solubility. The reaction is then poured into 1500 parts of water and basified to a pH of 8–9 by the addition of caustic soda and soda ash. Charcoal and a filter aid is added and the hot solution is clarified at 90° C. The filtrate is salted at 90° C. by adding 330 parts of sodium chloride. The mixture is stirred while being allowed to cool and is then filtered.

Example 6

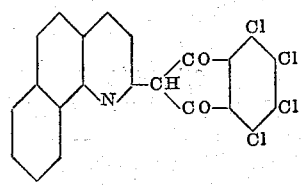

The procedure of Example 4 is followed using an equivalent quantity of tetrachlorophthalic anhydride in place of the dichlorophthalic anhydride. The resulting tetrachloroquinophthalone of the above formula is obtained. This is sulfonated by the procedure of Example 5 to give a water soluble dyestuff.

Example 7

Bleached sulfite paper pulp (4 parts dry weight) is slurried in 200 parts of water and 20 parts by volume of 1% solution of the product of Example 3 is added. The mixture is stirred and 2 parts by volume of a 4% rosin solution is added. The mixture is stirred well, after which 3 parts by volume of a 4% aluminum sulfate solution is added. An additional 100 parts of water is added and the mixture is poured on a screen to make a sheet of paper in the usual manner. The dried sheet of paper is found to be similar in shade and equal in fastness and tinctorial strength to paper dyed in the same manner with Chinoline Yellow KT (the beta-naphthoquinaldine unchlorinated phthalic anhydride dye) and superior to those dyed with the corresponding dyestuff from alpha naphthoquinaldine and unchlorinated phthalic anhydride.

I claim:

1. Compounds which in their free acid form have the formula:

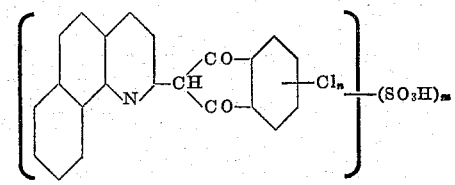

in which $n$ is a positive whole number less than 5 and $m$ is a positive whole number less than 3.

2. The dyestuffs of claim 1 in which $n$ is 1.
3. The dyestuffs of claim 1 in which $n$ is 2.
4. The dyestuffs of claim 1 in which $n$ is 4.

References Cited in the file of this patent

UNITED STATES PATENTS

| | | |
|---|---|---|
| 1,963,374 | Oglivie | June 19, 1934 |
| 2,006,022 | Krunzlein et al. | June 25, 1935 |

OTHER REFERENCES

Venkataraman: The Chemistry of Synthetic Dyes, 2 vols., Academic Press, 1952, pages 1198–9 and 458.